Feb. 12, 1952  A. J. SPARKS ET AL  2,585,511
HYDRAULIC SAFETY DEVICE
Filed Feb. 10, 1951
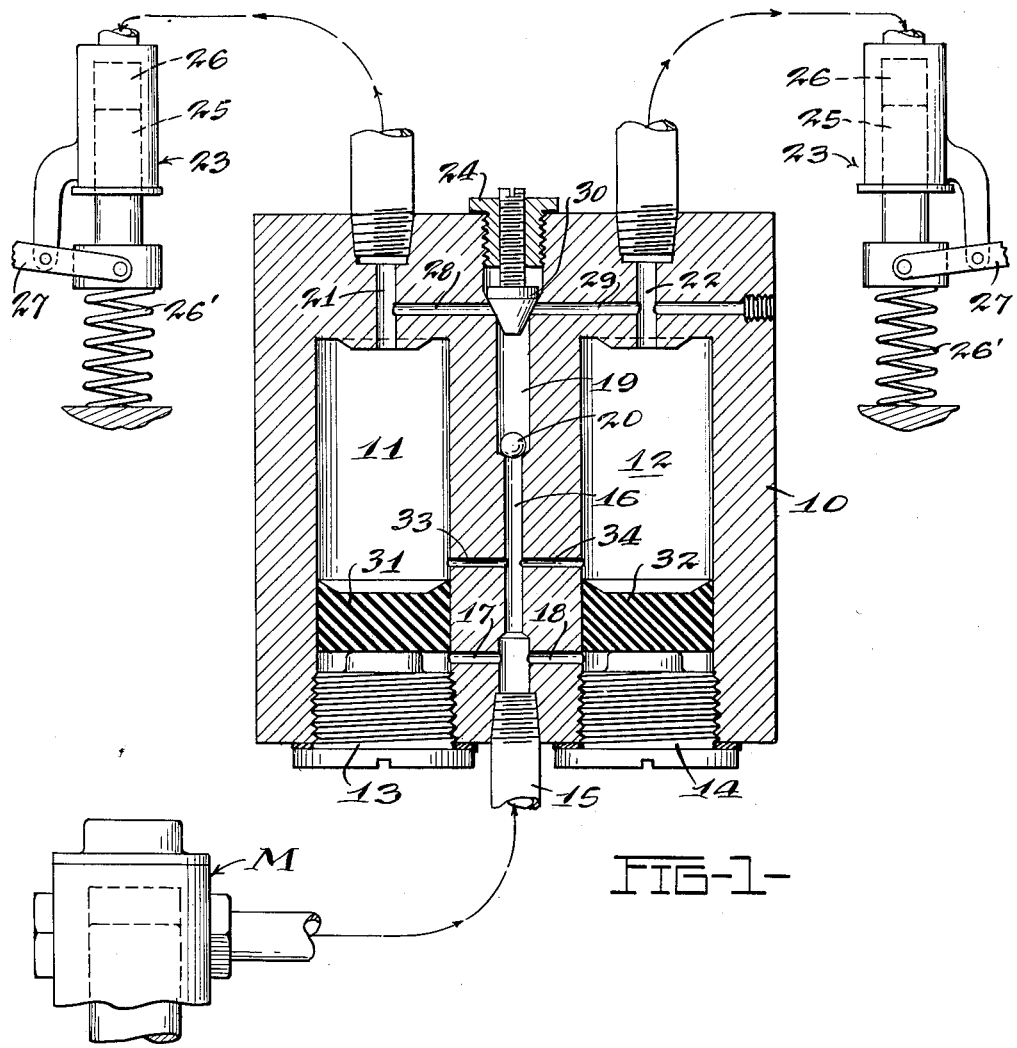
FIG-1-
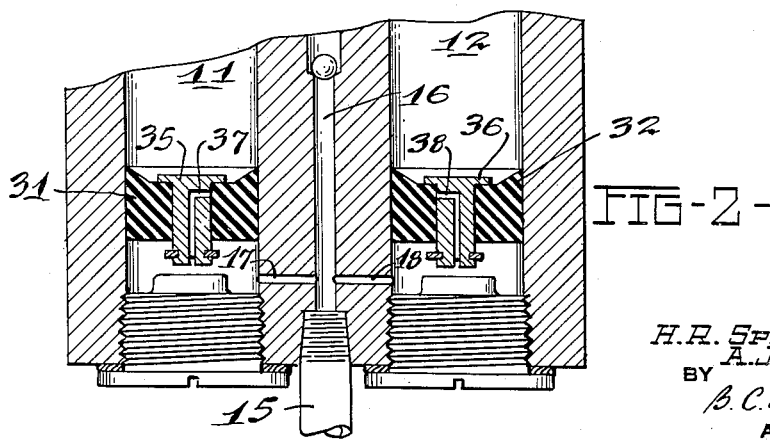
FIG-2-
INVENTORS:
H. R. SPARKS,
A. J. SPARKS.
BY
B. C. Foussianes
ATTORNEY Patented Feb. 12, 1952

2,585,511

UNITED STATES PATENT OFFICE 2,585,511

HYDRAULIC SAFETY DEVICE

Albert J. Sparks and Harvey R. Sparks,
Lambertville, Mich.

Application February 10, 1951, Serial No. 210,348

16 Claims. (Cl. 60—54.6)

This invention relates to safety devices for hydraulic pressure systems and particularly hydraulic brake systems.

In the present commercial use of hydraulic brake systems of the multiple brake type, no provision is made for safety devices. As a result when a leak appears in one of the brakes or brake lines, the fluid is dissipated through this leak and the entire brake system becomes inoperative.

It is therefore an object of this invention to provide a safety device for hydraulic brake systems whereby when a leak occurs in one of the brakes or lines, the entire brake system will not become inoperative.

Another object of this invention is to provide a safety device which may be easily reset to operative position after the leak or damage has been repaired.

Other objects of the invention will appear hereinafter.

Referring to the accompanying drawing:

Fig. 1 is a sectional elevation view of the safety device together with the master and brake cylinders which are shown diagrammatically; and Fig. 2 is a fragmentary sectional elevation view of a modified form of the invention.

Basically our invention provides for a safety device interposed between the main hydraulic line from the master cylinder and the brake lines leading to the brakes.

As shown in Fig. 1, our invention provides for a housing 10 provided with cylindrical openings 11, 12. The bottom of each of these openings is sealed by plugs, 13, 14, respectively. The lower part of the housing 10 is provided with an inlet 15 connected to a master cylinder M. Inlet ports 17, 18 extend between the inlet 15 and the cylindrical openings 11, 12 at the bottom of the cylindrical openings.

A vertical channel 16 extends upwardly from the inlet 15 toward the top of the housing 10. The upper portion 19 of the channel 16 is of slightly larger diameter. A small steel ball 20 is placed in this upper portion 19 and operates as a check valve preventing the flow of fluid downwardly through the upper portion 19 of the vertical channel 16.

Outlet channels 21, 22 extend upwardly from the top of the cylindrical openings 11, 12 respectively, and are connected to the brake lines leading to brakes 23. The brakes are diagrammatically shown as comprising a piston 25, operating in a cylinder 26 against the action of a spring 26' and actuating a lever 27 to apply a brake (not shown). It is contemplated that a pair of brakes might be connected to each of the outlet channels 21, 22.

Reset ports 28, 29 extend between the upper portion 19 of the vertical channel 16 and the outlet channels 21, 22 respectively. A needle valve 30 is seated in the top of the upper portion 19 at the juncture of the portion 19 and the reset ports 28, 29. A locknut 24 is provided to keep the valve 30 in the desired position.

Freely floating pistons 31, 32 are positioned in each of the cylindrical openings, respectively, the upper portion of each of the pistons being shaped to conform with the configuration of the upper part of the housing which forms the top of the cylindrical openings. The pistons 31, 32 are preferably made of a material which is resilient and resistant to the deleterious action of hydraulic fluid.

Pressure equalizer ports 33, 34 are provided in the housing and extend between the cylindrical openings and the vertical channel 16 at a point slightly above the top of the pistons when they are in their lowermost position in the cylindrical openings. When the pistons 31, 32 return to their normal positions at the bottom of the cylindrical openings 11, 12, the fluid pressure is equalized through the ports 33, 34 so that there is no pressure differential between the top and bottom of the pistons.

In the modified form of the invention shown in Fig. 2, the safety device is identical to that shown in Fig. 1, except that the equalizer ports are eliminated and small steel pistons 35, 36 are provided in the pistons 31, 32 respectively. These small pistons are provided with pressure equalizer vents 37, 38 respectively. When the pistons 31, 32 return to their normal positions at the bottom of the cylindrical openings, the small pistons 35, 36 are pushed upwardly thereby permitting equalization of pressure between the top and bottom of the pistons 31, 32 through the equalizer vents 37, 38.

The operation of the safety device may be summarized as follows:

The normal position of the various parts is shown in Fig. 1: the pistons 31, 32 being at the bottom of the cylindrical openings 11, 12; and the needle valve 30 being seated at the juncture of the reset ports 28, 29 and the upper portion 19 of the vertical channel 16. Hydraulic fluid fills the cylindrical openings, and the various ports, channels, and lines.

When the brake pedal is depressed, the master cylinder M is operated to force the fluid through the inlet 15. The needle valve 30 prevents flow of fluid through the upper portion 19 of the vertical channel 16 and through the reset ports 28, 29. Any flow of fluid through the pressure equalizer ports will be very restricted since the diameter of the equalizer ports 33, 34 is very small in relation to the inlet ports 17, 18. Therefore, substantially the entire flow of fluid due to the pressure from the master cylinder will be through the inlet ports 17, 18 to the bottom of the pistons 31, 32 and tend to force the pistons upwardly. The upward movement of the pistons will force the fluid above the pistons to move upwardly and thereby exert a pressure to actuate the individual brakes 23. Upon moving up slightly the pistons will close off the equalizer ports 37, 38 and thereby prevent any fluid from passing through these ports.

When the brake pedal is released, the fluid pressure in the entire system will be relieved. The springs 26' in the brakes will operate to return the brake pistons 25 to their normal position in turn forcing the fluid to push the pistons 31, 32 in the safety device downwardly in the cylindrical openings 11, 12. When the pistons 31, 32 reach their normal position in the bottom of the cylindrical openings, the pressure between the top and bottom of the pistons 31, 32 will be equalized through the pressure equalizer ports 33, 34. If provision were not made for equalizing the pressure above and below the pistons 31, 32, the pressure would eventually be built up above the pistons locking the brakes in their applied position.

If a leak occurs in the line leading, for example, from outlet 21 and the brake pedal is depressed actuating master cylinder M, the fluid pressure on the bottom of the piston 31 will force the piston 31 upwardly and cause it to close off the outlet 21. This will prevent loss of fluid through the leaking line but will not interfere with the normal operation of the other side of the device. The brakes connected to the other side will operate in the usual manner.

After the leak has been repaired, the needle valve 30 is caused to be unseated and the brake pedal is depressed actuating the master cylinder and forcing fluid through the upper portion 19 of the vertical channel 16 and through the reset port 28 to the outlet 21 and thence out to the repaired line. When the brake pedal is released, the action of the brake spring 26' in returning the brake to non-operating position will force the fluid back through the safety device. The small ball 20 will prevent the fluid from flowing back through the vertical channel 16 and therefore the fluid will force the piston 31 downwardly back to its normal position. If the piston 31 is not positioned by one depression of the brake pedal, it will become so after several depressions of the brake pedal.

The needle valve 30 is then reseated and the safety device is again in position to operate. In case the needle valve is inadvertently left in the unseated position, the brake system will still be operative except that the safety device will, to all intents and purposes, be by-passed.

In the modified form of the invention shown in Fig. 2, in which the equalizer ports 33, 34 are eliminated, the pressure is equalized through the vents 37, 38 in the small pistons 35, 36. When the pistons 31, 32 are moved to their normal position, the small pistons 35, 36 are pushed upwardly opening the vents 37, 38.

It can thus be seen that our invention provides a hydraulic safety device which operates to positively prevent the flow of fluid to a leaking line without, at the same time, interfering with the flow of fluid to the other lines. In addition, the device is such that it may easily be reset after the leak is repaired.

Modifications may be resorted to within the spirit and scope of the invention.

We claim:

1. In a fluid operated system, a pair of cylinders, each of said cylinders being connected at one end thereof to a source of fluid under variable pressure, an outlet at the other end of each of said cylinders, a channel extending between the source of fluid and each of the outlets, a valve operable to prevent the flow of fluid through said channel to said outlets, a one-way valve positioned in said channel and operable to prevent the flow of fluid in said channel toward the source of fluid, a freely reciprocable piston positioned in each of said cylinders, and means for causing the equalization of the fluid pressure on the opposite sides of the piston in each cylinder when the piston is at the end of the cylinder nearest the source of fluid.

2. The apparatus set forth in claim 1, said means for causing the equalization of the fluid pressure on the opposite sides of the piston in each cylinder comprising a channel extending from the source of pressure to a point in each cylinder above the position of the piston when the piston is at the end of the cylinder nearest the source of fluid.

3. The apparatus set forth in claim 1, said means for causing the equalization of the fluid pressure on the opposite sides of the piston in each cylinder comprising ports of very small diameter extending between the channel and each of the cylinders at a point in each of the cylinders which will be above the position of the piston when the piston is at the end of the cylinder nearest the source of fluid.

4. The apparatus set forth in claim 1, said means for causing the equalization of the fluid pressure on the opposite sides of the piston in each cylinder comprising a valve in each said piston operable to provide a vent between the opposite sides of the piston when the piston moves to its furthermost position in the end of the cylinder nearest the source of fluid.

5. The apparatus set forth in claim 1, in combination with hydraulically operated units connected to each of said outlets, each of said units including a spring opposing the action of the fluid.

6. In a fluid operated system, a pair of cylinders, each of said cylinders being connected at one end to a source of fluid under variable pressure, outlets at the other end of each of said cylinders, a piston reciprocable in each of said cylinders, and means for causing an equalization of the fluid pressure on the opposite sides of the piston in each cylinder when the piston is at the end of the cylinder nearest the source of fluid, said means comprising a channel extending from the source of pressure to a point in each cylinder above the position of the piston when the piston is at the end of the cylinder nearest the source of fluid.

7. In a fluid operated system, a pair of cylinders, each of said cylinders being connected at one end to a source of fluid under variable pressure, outlets at the other end of each of said cylinders, a piston reciprocable in each of said cylinders, and means for causing an equalization of the fluid pressure on the opposite sides of the piston in each cylinder when the piston is at the end of the cylinder nearest the source of fluid, said means comprising ports of very small diameter extending between the source of pressure and each of the cylinders at a point in each of the cylinders which will be above the position of the piston when the piston is at the end of the cylinder nearest the source of fluid.

8. In a fluid operated system, a pair of cylinders, each of said cylinders being connected at one end to a source of fluid under variable pressure, outlets at the other end of each of said cylinders, a piston reciprocable in each of said cylinders, and means for causing an equalization of the fluid pressure on the opposite sides of the piston in each cylinder when the piston is at the end of the cylinder nearest the source of fluid, said means comprising a valve in each said piston operable to provide a vent between the opposite sides of the piston when the piston moves to its furthermost position in the end of the cylinder nearest the source of fluid.

9. In a fluid operated system, a safety device comprising a cylinder connected at one end thereof to a source of fluid under variable pressure, an outlet at the other end of the cylinder, a channel extending between the source of pressure and the outlet, a valve positioned in said channel and operable to prevent the flow of fluid to the outlet, a one-way valve positioned in said channel and operable to prevent flow in said channel in the direction of the source of fluid, a piston reciprocable in said cylinder and means for causing the equalization of the fluid pressure on the opposite sides of the piston when the piston is at the end of the cylinder nearest the source of fluid.

10. The safety device set forth in claim 9, said means for causing the equalization of the fluid pressure on the opposite sides of the piston comprising a second channel extending from the source of pressure to a point in the cylinder above the position of the piston when the piston is at the end of the cylinder nearest the source of fluid.

11. The safety device set forth in claim 9, said means for causing the equalization of the fluid pressure on the opposite sides of the piston comprising a port of very small diameter extending between the channel and the cylinder at a point in the cylinder above the position of the piston when the piston is at the end of the cylinder nearest the source of fluid.

12. The safety device set forth in claim 9, said means for causing the equalization of the fluid pressure on the opposite sides of the piston comprising a valve in the piston operable to provide a vent between the opposite sides of the piston when the piston moves to its furthermost position in the end of the cylinder nearest the source of fluid.

13. In a fluid operated system, a safety device comprising a cylinder connected at one end thereof to a source of fluid under variable pressure, an outlet at the other end of the cylinder, a freely reciprocable piston positioned in the cylinder, and means for causing an equalization of the fluid pressure on the opposite sides of the piston when the piston is at the end of the cylinder nearest the source of fluid, said means comprising a channel extending from the source of fluid to a point in the cylinder above the position of the piston when the piston is at the end of the cylinder nearest the source of fluid.

14. In a fluid operated system, a safety device comprising a cylinder connected at one end thereof to a source of fluid under variable pressure, an outlet at the other end of the cylinder, a freely reciprocable piston positioned in the cylinder, and means for causing an equalization of the fluid pressure on the opposite sides of the piston when the piston is at the end of the cylinder nearest the source of fluid, said means comprising a valve in the piston operable to provide a vent between the opposite sides of the piston when the piston moves to its furthermost position in the end of the cylinder nearest the source of fluid.

15. In a fluid operated system, a safety device comprising a pair of cylinders, each of said cylinders being connected to a source of fluid under variable pressure, an outlet at the other end of each of said cylinders, a channel extending between the source of fluid and each of the outlets, a valve operable to prevent the flow of fluid through said channel to said outlets, a one-way valve positioned in said channel and operable to prevent the flow of fluid in said channel toward the source of fluid, and a freely reciprocable piston positioned in each of said cylinders.

16. In a fluid operated system, a safety device comprising a cylinder connected at one end thereof to a source of fluid under variable pressure, an outlet at the other end of the cylinder, a channel extending between the source of pressure and the outlet, a valve operable to prevent the flow of fluid to the outlet, a one-way valve positioned in said channel and operable to prevent flow of fluid in said channel in the direction of the source of fluid, and a freely reciprocable piston positioned in said cylinder.

ALBERT J. SPARKS.
HARVEY R. SPARKS.

REFERENCES CITED

The following references are of record in the file of this patent:

UNITED STATES PATENTS

| Number | Name | Date |
|---|---|---|
| 1,795,818 | Allred et al. | Mar. 10, 1931 |
| 2,061,763 | Gilstrap et al. | Nov. 24, 1936 |
| 2,127,399 | George et at. | Aug. 16, 1938 |
| 2,203,908 | Hess | June 11, 1940 |
| 2,249,227 | Press | July 15, 1941 |